INVENTORS
GERO HEYMER &
HEINZ HARNISCH
BY

*Connolly and Hutz*

ATTORNEYS

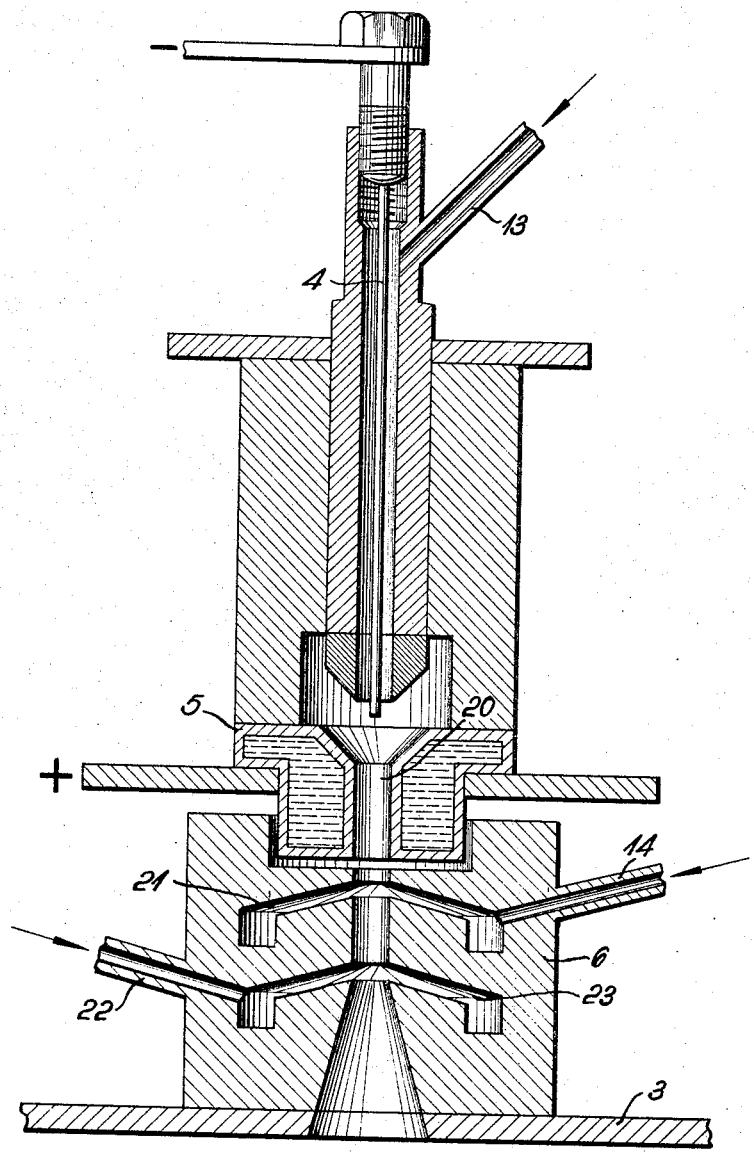

3,345,134
PROCESS AND APPARATUS FOR THE MANUFACTURE OF TITANIUM NITRIDE
Gero Heymer, Knapsack, near Cologne, and Heinz Harnisch, Lovenich, near Cologne, Germany, assignors to Knapsack Aktiengesellschaft, Knapsack, near Cologne, Germany, a corporation of Germany
Filed Apr. 11, 1963, Ser. No. 272,333
Claims priority, application Germany, Apr. 21, 1962, K 46,551
17 Claims. (Cl. 23—191)

The present invention relates to a process for the continuous manufacture of titanium nitride from titanium tetrachloride in the gaseous phase, and to an apparatus suitable for use in carrying out this process.

It is known that titanium nitride can be prepared by reacting pulverized, metallic titanium at high temperatures, inter alia with the use of an electric arc, with nitrogen. In this process, which uses the very costly titanium powder as the starting material, the nitride is obtained in the form of a relatively coarse powder. In order to replace this very costly starting material by a cheaper substance and in order to obtain a more fine-grained final product, attempts have also been made to transform the titanium contained in some scrap qualities into its nitride by first transforming the titanium into its hydride, then pulverizing the hydride and reacting it ultimately with nitrogen at high temperatures so as to obtain the nitride. In the subsequent extraction with aqua regia any constituents other than titanium nitride are dissolved. The expenses saved due to titanium scrap being used, are, however, practically balanced by the additional processing steps required in this process.

It is also known that titanium nitride can be prepared by reacting titanium tetrachloride with gaseous or liquid ammonia with the resultant formation of titanium amide and by transforming the amide at high temperatures via the imide into the nitride, which is, however, a rather disadvantageous process. Thus, for example, the amides are voluminous products which, on the one hand, are readily converted into dust form on expelling the ammonia contained in the amide or imide linkage but, on the other hand, sinter together at the high temperatures which have to be employed towards the end of the reaction, and therefore have to be transformed again into powder form.

If titanium tetrachloride and ammonia are reacted with one another from the onset at high temperatures, the hydrogen chloride evolved during the reaction, and, if an excess of ammonia is used, the resulting ammonium chloride will corrode the hot walls of the reaction vessel. All of the aforesaid processes involve the further disadvantage that the degree of purity of the titanium nitride obtained is impaired due to the reaction the compound undergoes during the annealing step with the material of which the reaction vessel is made.

The present invention now provides a process for making titanium nitride which avoids any of the disadvantages mentioned above, wherein ammonia or a nitrogen-hydrogen mixture rapidly pre-heated to a high temperature is mixed in a mixer (whose walls are maintained at temperatures below about 500° C. and preferably at about 200° C.) with gaseous titanium tetrachloride with the resultant formation of titanium nitride via not accurately determined intermediate stages and according to the summation equation:

(1) $3TiCl_4 + 4NH_3 \rightarrow 3TiN + 12HCl + \frac{1}{2}N_2$

The ammonia or the nitrogen-hydrogen mixture should be preheated at temperatures of more than 1000° C., preferably of more than 2500° C., so as to obtain yields satisfactory from an economical point of view. The ammonia or the nitrogen-hydrogen mixture is advantageously heated by electrical means, for example in an arc, because indirect heating to temperature of 1000° C. and more, for example in a heat exchanger which takes more time, would result in the ammonia being substantially decomposed, or would result in the nitrogen-hydrogen mixture representing considerable difficulties due to the permeability to hydrogen of the walls of the reaction vessel. If the ammonia or the nitrogen hydrogen mixture is heated in an electric arc, then the temperature produced is generally so high that the substance appears at least partially in the form or radicals or atomic nitrogen and hydrogen. The ammonia or nitrogen-hydrogen mixture can be heated in an arc arrangement of conventional design.

In order to obtain a good yield of a well crystallized product, it is advantageous to mix the titanium tetrachloride in the gaseous phase as rapidly as possible, preferably within $\frac{1}{10}$ to $\frac{1}{1000}$ second, with its reaction components leaving the arc at a high velocity of flow.

The contamination of the resulting titanium nitride by reaction with the material used for making the reaction vessel and the attack of the hydrogen chloride evolved on the walls of the reaction vessel are avoided by maintaining the walls of the mixer at temperatures below about 500° C., preferably at about 200° C.

To this end, the ammonia or the nitrogen-hydrogen mixture heated in the electric arc is caused to flow through a channel, having, for example, a circular cross-section and mixed therein with gaseous titanium tetrachloride supplied to the channel through an annular slit disposed therein and in a direction approximately perpendicular to the direction of flow of the ammonia or the nitrogen-hydrogen mixture in said channel.

The gaseous material should leave the arc with a velocity of flow of about 200 m./second, which is obtained by appropriately dimensioning the cross-sectional area of the channel outlet, so that the gases on being mixed with the titanium tetrachloride still appear in the atomic or radical state, i.e. have not yet recombined into molecules or, for example the ammonia, has not decomposed into substantially less active gas molecules.

It is also advantageous to vaporize the titanium tetrachloride under a certain pressure so that the $TiCl_4$ in vapor form is supplied at a relatively high velocity to the pre-heated ammonia or the nitrogen-hydrogen mixture. Alternatively, the $TiCl_4$ may be supplied in a direction tangential to the direction of flow of the hot ammonia or the hot nitrogen-hydrogen mixture cycled in the channel which has, for example, a circular cross section. In any case, it is important that the two reaction partners by mixed with one another as rapidly as possible, for example within some tenth to thousandth seconds.

The hot reaction mixture may be then conveyed to a moved and cooled surface and allowed to cool thereon so as to avoid undesirable secondary reactions. This moved and cooled surface is preferably cleansed by means of a suitable device, for example a stationary knife or a brush, and thereby freed from the reaction product depositing thereon in the form of a loose layer, so that the arriving reaction mixture is always received by a clean surface.

The material should advantageously be cooled with the exclusion of the atmosphere, since the hot reaction mixture would already react with traces of oxygen or steam. The starting materials as well should be free from oxygen, steam and other impurities, when it is desired to obtain a pure reaction product. When the cooling temperature is too low, the deposited reaction products will absorb unreacted $TiCl_4$. It is hence advantageous to maintain the temperatures so high that such absorption is substantially avoided. Thus, it is sufficient to maintain the coolant, for example water, with which the moved surface is cooled at temperatures within the range of 50 to 300° C., preferably 50 to 100° C., to obtain a final product substantially free from TiCl$_4$.

In this manner, the calorific energy inherent to the hot reaction components can be recovered in the form of hot water or steam.

Still further, the ammonia or the nitrogen-hydrogen mixture should be used in an excess over the stoichiometrical amount calculated from the reaction equation, more especially in an excess of 0.2 to 10, preferably 1 to 3 times, the stoichiometrical amount.

In the nitrogen-hydrogen mixture the molar ratio of nitrogen to hydrogen is advantageously 1:4, but mixtures wherein the molar ratio of the two components is, for example, 1:3 to 1:6 may also be used. It should, however, be borne in mind that where a smaller ratio is used, the nitrogen has to be employed in an excess of 0.2 to 10 times, preferably 1 to 3 times, the amount necessary for the complete transformation of titanium tetrachloride into titanium nitride.

Where a greater molar ratio is used, the hydrogen should be used in analogous manner in an excess of 0.2 to 10 times, preferably 1 to 3 times, the amount necessary for completely binding the chlorine.

The space/time yield is greater than 1 kg. titanium nitride per hour and the reaction product is obtained in the form of finely divided crystalline powder, the reaction product being most advantageously collected in a receiver maintained under the atmosphere of an inert gas. The escaping gases contain finely divided reaction product in suspension and optionally unreacted TiCl$_4$, the reaction product contained therein being removed by dry gas purification. If the gas also contains TiCl$_4$, it is again necessary to maintain the walls of the dust removing device at temperatures so high that the TiCl$_4$ is prevented from being condensed. These temperatures are a function of the partial TiCl$_4$ pressure prevailing in the device and should be situated about 5 to 100° C. above the dew point of TiCl$_4$ under the particular operating conditions used. The dust may be separated, for example, by means of a cyclone, a baffle separator or a calming vessel.

When an excess of ammonia is used, it is furthermore advantageous to maintain the flowing reaction gas during the cooling and dry gas purification at temperatures so high that ammonium chloride is not yet condensed, which depend on the particular partial pressure of the ammonium chloride and preferably amount to 250 to 350° C.

Depending on the components contained in the dust-free off-gases, unreacted titanium tetrachloride and hydrogen chloride or ammonium chloride are separated therefrom in known manner. The TiCl$_4$ may be then reintroduced into the process. The remaining nitrogen-hydrogen mixture may be used again under appropriate processing conditions or utilized in another convenient manner.

According to a further embodiment of the process of the present invention, hydrogen heated to a high temperature in an electric arc is allowed to react with titanium tetrachloride to form titanium trichloride and the resulting hot reaction product is immediately treated with ammonia to react therewith in the gaseous phase according to the summation equation:

(2) 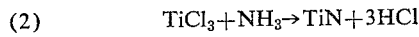

with the resultant formation of titanium nitride.

It is here advantageous to heat the hydrogen in the arc at so high a temperature that it appears at least partially in the atomic state and then to cause the hydrogen to flow through a channel having, for example, a circular cross-section, wherein it is mixed with titanium tetrachloride supplied under pressure through an annular slit, the titanium tetrachloride being transformed into titanium trichloride. In this process variant the apparatus is modified by the disposition of a second annular slit distanced from the first annular slit in such a manner that the hot reaction mixture which preferably contains gaseous TiCl$_3$ can be admixed through the second annular slit with gaseous ammonia as long as the raection mixture has a temperature of at least 1000° C. and preferably more than 1500° C.

This method offers the advantage that the ammonia need not be passed through the arc so that it cannot undergo partial thermal decomposition before the actual reaction takes place.

Alternatively, the hot reaction mixture may be cooled rather gradually in the absence of undesirable secondary reactions taking place.

The solid reaction components are separated and the off-gas is worked up in a manner analogous to that described above.

The solid substances collected at a position below the housing of the cooling means and removed from the off-gas by dry gas purification are introduced under the atmosphere of an inert gas into water or dilute HCl and serve to isolate the titanium nitride formed. Any by-products which may have formed, for example titanium trichloride, dissolve. The titanium nitride is ultimately separated from its solution by filtration.

The titanium nitride prepared in the manner described above is distinguished by its high degree of purity and its substantially stoichiometrical composition.

The process of the present invention enables products consisting to an extent of more than 99% of titanium and nitrogen to be prepared, the deviation from the stoichiometrical composition TiN being not greater than 0.7 atom percent. The product is X-ray crystalline, crystallizes in the cubic δ-phase of the system titanium-nitrogen, and possesses a lattice constant of: $a=4.25$ to 4.26 A.

The titanium nitride so prepared is obtained in the state of very fine distribution. This is an especially important property when the powdery titanium nitride is intended for being converted into shapes by compression and subsequent sintering or for being used for plasma-flame spraying.

Depending on the size of the individual titanium nitride particles, the coloration of the product varies between black and brass-colored tints.

Various apparatus forms suitable for use in carrying out the process of the present invention are illustrated diagrammatically in the accompanying drawings of which:

FIG. 4 represents an arc and a mixing nozzle which can be used with the proviso that the TiCl$_4$ is first reduced with hydrogen to TiCl$_3$ and then reacted with ammonia to form titanium nitride.

Figure 1:
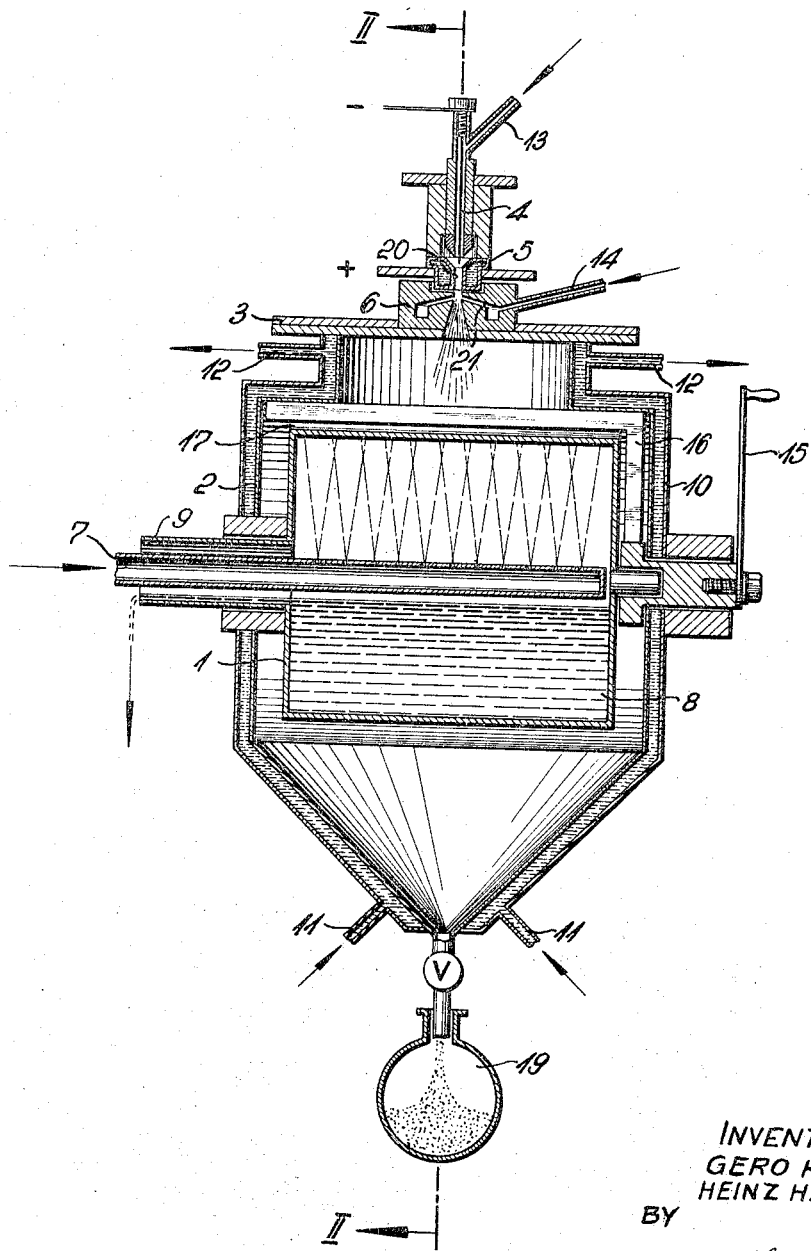
FIG. 1 represents a side view taken along the line II—II of FIG. 2 of an apparatus wherein the reaction products are cooled, for example, on a moved and cooled surface of cylindrical shape.
Figure 2:
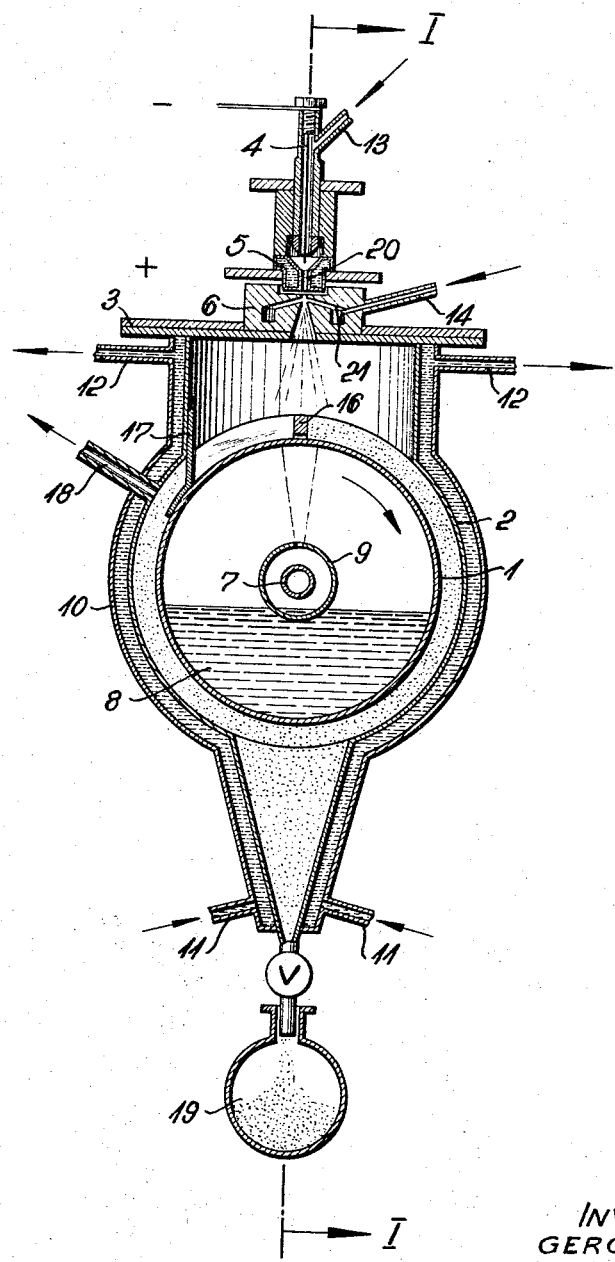
FIG. 2 represents the apparatus along the line II—II of FIG. 1.

The process of the present invention is more particularly carried out in the manner exemplified and illustrated in FIGS. 1 and 2 of the accompanying drawings: the ammonia or the nitrogen-hydrogen mixture introduced at 13 into the burner is pre-heated on being passed through the arc burning between cathode 4 and anode 5. In channel 20 of the mixing nozzle 6 the pre-heated starting product which is partially split into radicals or atoms, is admixed with gaseous titanium tetrachloride supplied through line 14 and, for example, through the annular slit 21. The burner and the mixing nozzle 6 are seated in a recess of the housing cover 3. The reaction products and unreacted starting material arrive at the moved and cooled roller 1. A perforated tube 7 disposed in the axis of the roller serves to spray from the inside a cooling agent 8 at about 50 to 350° C., for example water or oil, against the segment of roller 1 which is nearest to the burner. The lower half of the roller 1 is filled with coolant coming from the upper part thereof. Coolant in excess leaves the roller 1 through an open cylinder at 9. The cooling roller 1 is surrounded by a housing 2 which in turn is enveloped by a cooling jacket 10 provided with a short inlet tube 11 and a short outlet tube 12. The solid reaction products adhering to the surface of roller 1 and to the internal walls of the housing 2 are removed with the help of a knife 17 rigidly connected to the housing and with the help of a pivoted knife 16, the latter being actuated by means of a crank 15 or another mechanical driving means disposed at the same position. The reaction products are collected in a collecting vessel 19. The off-gases leave the apparatus through line 18 and are passed, for example, through further separating means, for example a cyclone or a baffle separator. Alternatively, the reaction products may be cooled in a manner other than described above, i.e. they need not obligatorily be cooled on a cooled and moved surface.

Figure 3:
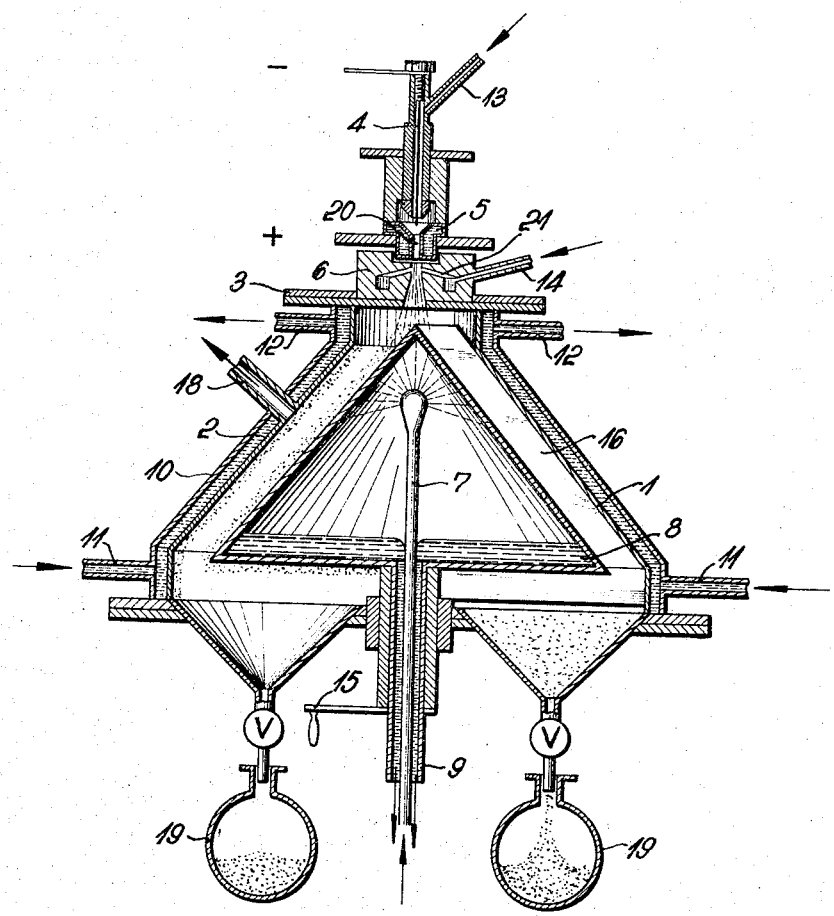
FIG. 3 represents a longitudinal view of an apparatus wherein the moved and cooled surface is, for example, cone-shaped.

The apparatus illustrated in FIG. 3 of the accompanying drawing is suitable for use in a still further mode of executing the process of the present invention. In this variant of the process, the reaction products are separated on a rotating cone. The other parts of the apparatus are analogous to those indicated in FIG. 1 and need not specifically be referred to.

When it is intended to first reduce the $TiCl_4$ with hydrogen to $TiCl_3$ and then to react the latter with ammonia to obtain titanium nitride, the hydrogen is advantageously introduced at 13 into the burner as shown in FIG. 4 of the accompanying drawing, pre-heated at temperatures of more than 1000° C., preferably more than 2500° C., in the arc burning between the cathode 4 and the anode 5, and then caused to flow through channel 20, where it is rapidly and intimately mixed with $TiCl_4$ supplied at 14 and conducted through an aperture, for example an annular slit, and the $TiCl_4$ is reduced to $TiCl_3$.

The hydrogen is used in an excess of 1.2 to 20 times, preferably 2.5 to 15 times, the theoretical amount. The resulting hot reaction mixture is then admixed rapidly and intimately with gaseous ammonia supplied through line 22 and flowing through an aperture, for example, an annular slit 23 to channel 20.

Care should be taken that the inlet openings of the $TiCl_4$ and $NH_3$-supply lines in the channel are distanced from one another so that the hot reaction mixture resulting from the reaction of the $TiCl_4$ with the hydrogen has a temperature of at least 1000° C., preferably more than 1500° C., when it is mixed with the ammonia, the reaction product being cooled either on a moved and cooled surface or gradually, for example, in a sojourn zone.

The reaction product so obtained is than processed in a manner analogous to that described above.

The present invention provides more especially a process for the continuous manufacture of titanium nitride from titanium tetrachloride in the gaseous phase, wherein gaseous titanium tetrachloride is rapidly and intimately mixed in a mixing zone, whose walls are maintained at a temperature of about 136° C. to about 500° C., preferably about 200° C., with ammonia pre-heated in an electric arc at temperatures above 1000° C., preferably above 2500° C., or with a nitrogen-hydrogen mixture heated to a corresponding temperature, or with hydrogen heated to a corresponding temperature which is used in an excess of 1.2 to 20 times the theoretical amount, and wherein, with the proviso that hydrogen is used, the reaction mixture which substantially consists of titanium trichloride and has a temperature of at least 1000° C., preferably 1500° C., is mixed rapidly and intimately in the mixing zone with ammonia, and the resulting reaction products are cooled and collected, preferably under the atmosphere of an inert gas.

According to a further embodiment of the present invention, the ammonia or the nitrogen-hydrogen mixture or the hydrogen heated in the electric arc is caused to flow through a channel having, for example, a circular cross section and serving as the mixing zone, and mixed therein with titanium tetrachloride supplied through an annular slit projecting into the channel in a direction approximately perpendicular to the direction of flow of the ammonia or the nitrogen-hydrogen mixture or the hydrogen in said channel. Alternatively, the ammonia or the nitrogen-hydrogen mixture or the hydrogen heated in the electric arc may be caused to flow through a channel having, for example, a circular cross section and serving as the mixing zone, and mixed therein with $TiCl_4$ introduced in a direction tangential to the direction of flow of the ammonia, the nitrogen-hydrogen mixture or the hydrogen in said channel. The reaction components are rapidly and intimately mixed with one another within $1/10$ to $1/1000$ second. Care should be taken that the off-gases leave the arc at a velocity of flow about about 200 m./second which is obtained by appropriately dimensioning the cross sectional area of the arc channel outlet, so that the gases on being admixed with the $TiCl_4$ are at least partially in the atomic or radical state. The ammonia or the nitrogen-hydrogen mixture is used in an excess of about 0.2 to 10 times, preferably 1 to 3 times, the theoretical amount, and the nitrogen-hydrogen mixture is employed in a molar ratio of about 1:6 to 3:1, preferably about 1:4. When hydrogen is used, it should be employed in an excess of 2.5 to 15 times the theoretical amount.

The reaction products are cooled on a moved and cooled surface which is maintained at temperatures of about 50 to 350° C. and from which the precipitated material is constantly removed by a scraping means. The off-gases emanating from the cooling zone are freed from solid reaction product in conventional manner, and depending on the gaseous components contained therein, liberated from $TiCl_4$, hydrogen chloride and/or ammonium chloride, the remaining nitrogen-hydrogen mixture being used again.

As shown in FIGS. 1 and 2 of the accompanying drawings, the apparatus used for carrying out the process of the present invention comprises a housing 2; a cooling jacket 10 surrounding the housing; a short inlet pipe 11 and a short outlet pipe 12 both disposed in the jacket; an off-gas line 18 disposed in the housing; a cover 3 for the housing; an electric arc arrangement consisting of a cathode 4, an anode 5 and a gas supply line 13; a mixing nozzle 6; the electric arc arrangement and the mixing nozzle being disposed above the recess in the cover for the housing; a supply line 14; an annular slit 21 and a channel 20; the supply line 14 being connected to the mixing nozzle and the annular slit 21 projecting into the channel 20 of the mixing nozzle; a cooling surface 1 shaped as a rotating hollowed cylinder disposed in the interior of the housing 2; the cylinder jacket receiving atomized material delivered from the mixing nozzle; a supply line 7 provided with holes or nozzles disposed in the interior of the cylinder for supplying a coolant; a pipe 9 through which the coolant is removed; a knife 17 rigidly connected to the housing 2; a second knife 16 pivotably connected to the housing; a crank 15 or another suitable means for actuating the knife 17 pivotably connected to the housing; and a receiver 19; the knives 16 and 17 serving as the cleansing means to scrap off reaction product depositing on the cooling surface, which is collected in receiver 19.

As illustrated in FIG. 3 of the accompanying drawings, the cooling surface 1 may be cone-shaped, the cone tip facing the mixing nozzle in which the material is mixed and through which it is atomized. As shown in FIG. 4 of the accompanying drawings, the mixing nozzle 6 is provided with a second supply line 22 and a second annular slit 23 whose outlet opening projects into the channel 20.

The following examples serve to illustrate the invention:

Example 1

3 kg. titanium tetrachloride were vaporized at an average rate of 6 kg./hr. and forced under a pressure of 1.3 atmospheres to pass through an annular slit into a channel having a circular cross section, in which the titanium tetrachloride was mixed with 1.1 normal cubic meters (measured at N.T.P.) ammonia heated in an electric arc and reacted according to the summation reaction equation:

(1) $\quad 3TiCl_4 + 4NH_3 \rightarrow 3TiN + 12HCl + \frac{1}{2}N_2$

As shown in Equation 1, this corresponded to a 1.3 excess of ammonia. The ammonia was used at a rate of flow of 2.2 normal cubic meters per hour. The mixing device was maintained at a temperature at 190° C. by means of cycle oil. The energy supplied to the arc for heating the ammonia was 10.8 kwhr. (150 amperes, 145 volts).

930 grams of a fine-powdered reaction product were obtained in which 87% of the titanium present appeared as TiN. After washing, the TiN-content was 99.6%, i.e. 63.8% of the titanium tetrachloride had undergone conversion into TiN. 26.5% of the TiCl₄ used could be recovered from the off-gas.

Example 2

5 kg. titanium tetrachloride were vaporized at an average rate of 5 kg./hr. and forced under a pressure of 1.3 atmospheres to pass through an annular slit into a channel having a circular cross-section, in which it was mixed and reacted with a mixture of 1 normal cubic meter nitrogen and 3 cubic meters hydrogen which had been heated in the electric arc at temperatures so high that the gases were partially in the atomic state. The proportion of gas used corresponded to an excess of nitrogen and hydrogen 2.4 respectively 1.5 times as high as the amounts thereof, which are theoretically required for the complete conversion of the TiCl₄ into TiN and HCl. The mixture was used at a rate of flow of 4 normal cubic meters per hour. The energy supplied to the electric arc for heating the gas mixture amounted to 30 kwhr. (180 amperes, 165 volts).

1.82 kg. of a fine powdered reaction product were obtained in which 67.4% of the titanium contained therein were present as TiN. After washing, the TiN-content was 99.7%. 47.8% of the TiCl₄ had undergone conversion into TiN. 28.9% of the TiCl₄ used were recovered from the off-gas.

Example 3

3.5 kg. titanium tetrachloride were vaporized at an average rate of 7 kg./hr. and forced under a pressure of 1.2 atmospheres to pass through an annular slit into a channel having a circular cross-section, in which it was mixed with 1.9 normal cubic meters hydrogen heated in the arc (rate of flow: 3.8 normal cubic meters/hr.) and reacted according to the reaction equation:

$$TiCl_4 + \frac{1}{2}H_2 \rightarrow TiCl_3 + HCl \quad (3)$$

The hot reaction mixture was immediately thereafter admixed with 1.2 normal cubic meters gaseous ammonia supplied through a second annular slit at a rate of 2.4 normal cubic meters/hr., the ammonia being reacted with the intermediary TiCl₃ according to the following reaction equation:

$$TiCl_3 + NH_3 \rightarrow TiN + 3HCl \quad (2)$$

The hydrogen was used as indicated in Equation 3 in an excess of 8.7 times the theoretical amount and the ammonia was used as indicated in Equation 2 in an excess of 1.9 times the theoretical amount. 10.3 kwhr. (145 amperes, 140 volts) were supplied to the arc for heating the hydrogen. 1.46 kg. of a fine-powdered reaction product were obtained from which 1.165 kg. pure titanium nitride were isolated. The soluble remainder of the substance consisted of amides respectively of amido chlorides of trivalent and tetravalent titanium.

The total yield of TiN, calculated on the titanium tetrachloride used, amounted to 91.4% of the theoretical.

We claim:

1. A process for manufacturing titanium nitride which comprises the steps of heating a reactant gas selected from the group consisting of ammonia and a nitrogen-hydrogen mixture in an electric arc to a temperature of at least 1000° C., rapidly and intimately mixing the reactant gas with gaseous titanium tetrachloride in a mixing zone whose walls are maintained by cooling at a temperature within the range of 136–500° C. and subsequently cooling and recovering the reaction products of said process.

2. A process as claimed in claim 1, wherein the reactant gas heated in the electric arc is allowed to flow through a channel serving as the mixing zone and mixed therein with the titanium tetrachloride supplied through an annular slit projecting into said channel in a direction approximately perpendicular to the direction of flow of the reactant gas.

3. A process as claimed in claim 1, wherein the reactant gas is allowed to flow through the channel serving as the mixing zone and mixed therein with the titanium tetrachloride introduced into said channel in a direction tangential to the direction of flow of the said reactant gas.

4. A process as claimed in claim 1, wherein the reaction components are rapidly and intimately mixed with one another within 1/10 to 1/1000 second.

5. A process as claimed in claim 1, wherein the reactant gas issues from the arc through its outlet channel at a velocity of flow of at least about 200 m./second and therefore is at least partially in the atomic state on being mixed with the titanium tetrachloride.

6. A process as claimed in claim 1, wherein the reactant gas is heated in the electric arc at temperatures of at least 2500° C.

7. A process as claimed in claim 1, wherein the reactant gas is used in an excess of 0.2 to 10 times the theoretical amount.

8. A process as claimed in claim 1, wherein the reactant gas is nitrogen-hydrogen mixture and it is used in a molar ratio within the range of about 1:6 to 3:1.

9. A process as claimed in claim 1, wherein the reaction products are cooled on a moved and cooled surface maintained at a temperature between about 50 to 350° C., the reaction products depositing thereon being constantly removed from the cooled surface by a scraping means.

10. A process for manufacturing titanium nitride which comprises the steps of heating hydrogen in an electric arc to a temperature of at least 1000° C., rapidly and intimately mixing the hydrogen with gaseous titanium tetrachloride to form a reaction product, rapidly and intimately mixing the reaction product at a temperature of at least 1000° C. with gaseous ammonia in a mixing zone whose walls are maintained by cooling at a temperature within the range of 136–500° C. and subsequently cooling and recovering the reaction product of the process.

11. A process as claimed in claim 10, wherein the hydrogen heated in the electric arc is allowed to flow through a channel serving as the mixing zone and mixed therein with the titanium tetrachloride supplied through an annular slit projecting into said channel in a direction approximately perpendicular to the direction of flow of the hydrogen.

12. A process as claimed in claim 10, wherein the hydrogen is allowed to flow through the channel serving as the mixing zone and mixed therein with the titanium tetrachloride introduced into said channel in a direction tangential to the direction of flow of said hydrogen.

13. A process as claimed in claim 10, wherein the reaction components are rapidly and intimately mixed with one another within 1/10 to 1/1000 second.

14. A process as claimed in claim 10, wherein the hydrogen issues from the arc through its outlet channel at a velocity of flow of at least about 200 m./second and therefore is at least partially in the atomic state on being mixed with the titanium tetrachloride.

15. A process as claimed in claim 10, wherein the hydrogen is heated in the electric arc at temperatures of at least 2500° C.

16. A process as claimed in claim 10, wherein the hydrogen is used in an excess of 1.2 to 20 times the theoretical amount.

17. A process as claimed in claim 10, wherein the reaction products are cooled on a moved and cooled surface maintained at a temperature between about 50 to 350° C., the reaction products depositing thereon being constantly removed from the cooled surface by a scraping means.

References Cited

UNITED STATES PATENTS

| | | | |
|---|---|---|---|
| 2,413,778 | 1/1947 | Olson | 23—191 |
| 2,664,402 | 12/1953 | Gromeans | 23—1 |

OTHER REFERENCES

Mellor: Comprehensive Treatise on Inorganic and Theoretical Chemistry, vol. 8, pp. 84–85 (1928).

OSCAR R. VERTIZ, *Primary Examiner.*

MILTON WEISSMAN, *Examiner.*

J. J. BROWN, H. S. MILLER, *Assistant Examiners.*